(12) United States Patent
Aksit et al.

(10) Patent No.: US 6,502,825 B2
(45) Date of Patent: Jan. 7, 2003

(54) PRESSURE ACTIVATED CLOTH SEAL

(75) Inventors: Mahmut Faruk Aksit, Troy, NY (US); Jeffrey Arthur Benoit, Scotia, NY (US); Abdul-Azeez Mohammed-Fakir, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 87 days.

(21) Appl. No.: 09/745,841

(22) Filed: Dec. 26, 2000

(65) Prior Publication Data

US 2002/0079654 A1 Jun. 27, 2002

(51) Int. Cl.[7] .................................................. F16J 15/32
(52) U.S. Cl. ........................ 277/355; 277/556; 277/653
(58) Field of Search ................................. 277/355, 556, 277/560, 653, 654

(56) References Cited

U.S. PATENT DOCUMENTS

| | | | |
|---|---|---|---|
| 4,453,723 A | * | 6/1984 | Greenwald |
| 4,645,217 A | * | 2/1987 | Honeycutt, Jr. et al. |
| 5,104,286 A | | 4/1992 | Donlan |
| 5,209,503 A | | 5/1993 | Heibel et al. |
| 5,265,412 A | | 11/1993 | Bagepalli et al. |
| 5,400,586 A | | 3/1995 | Bagepalli et al. |
| 5,474,306 A | | 12/1995 | Bagepalli et al. |
| 5,509,669 A | | 4/1996 | Wolfe et al. |
| 5,586,773 A | | 12/1996 | Bagepalli et al. |
| 5,657,998 A | | 8/1997 | Dinc et al. |
| 5,915,697 A | | 6/1999 | Bagepalli et al. |
| 5,934,687 A | | 8/1999 | Bagepalli et al. |
| 6,010,132 A | | 1/2000 | Bagepalli et al. |
| 6,042,119 A | | 3/2000 | Bagepalli et al. |
| 6,059,526 A | * | 5/2000 | Mayr |

FOREIGN PATENT DOCUMENTS

EP  0 989 287 A2  3/2000

* cited by examiner

Primary Examiner—Anthony Knight
Assistant Examiner—Alison K. Pickard
(74) Attorney, Agent, or Firm—Banner & Witcoff, Ltd.

(57) ABSTRACT

A seal assembly includes a cloth seal for sealing a cavity between a first mating body and a second mating body, the seal dividing the cavity into a high pressure region and a low pressure region. The cloth seal has a shim assemblage and a cloth assemblage. A first peripheral portion of the cloth seal may include a portion of the cloth assemblage and/or the shim assemblage which contacts the high pressure region and a second peripheral portion including a portion of the cloth assemblage adapted to contact the low pressure region. Knowing the flow conditions and pressure differential through the seal, the density of the cloth seal may be calibrated to control leakage and the shim and cloth assemblages may be designed to minimize contact loads on a mating body.

22 Claims, 6 Drawing Sheets

PRESSURE ACTIVATED CLOTH SEAL

FIELD OF THE INVENTION

The present invention is directed to seals for static or dynamic rotating applications. More particularly, the present invention relates to pressure activated cloth seals for static and dynamic applications.

BACKGROUND OF THE INVENTION

Seals can be used to minimize leakage of fluids including gas in applications where two relative movable mechanical members are in close proximity. The members may have substantial relative motion between one another, such as a turbine shaft against lubricating oil reservoir, or a rotatable turbine stage relative to a fixed support structure having to withstand a pressure differential across the stage. Also, the movement between members may be caused by vibration or thermal growth.

Leakage of gas and air can negatively impact performance of components in many systems including a gas turbine combustion system. Mating components may be formed of different materials and can be subjected to different temperatures during operation. Consequently, the components commonly experience varying degrees of thermal growth. For example, a fuel nozzle burner tube and a combustion liner cap assembly support structure in a gas turbine move radially, axially, and circumferentially relative to one another based on thermal growth. Similar relative movement may also occur due to dynamic pulsing of the combustion process. To prevent leakage and compensate for the relative movement of the fuel nozzle burner tube, a split ring metal seal has been placed around the outer diameter of the fuel nozzle burner tube providing an interface between the burner tube and a portion the cap assembly support structure.

Rather than an airtight seal, a certain amount of leakage between the fuel nozzle burner tube and the cap assembly support structure is desired. In this regard, hot gases from the combustion reaction zone tend to "backflow" into a tubular cavity between the fuel nozzle burner tube and the cap assembly support structure components. When the hot gases flow into the tubular cavity, they can damage the hardware, which significantly shortens the usable life of the components. To prevent backflow, a certain amount of air leakage needs to be permitted to flow through the seal. In an attempt to address this concern, the conventional split ring metal seal has slots cut through the seal to allow some leakage of air.

Several problems exist with the split ring metal seal. Since the seal is metal and the interfacing components are metal, the components and seal tend to rub, vibrate or otherwise move against one another causing excessive wear of the seal and the components. Further, the burner tube and cap assembly support structure components and the seal generally do not perfectly fit together due to slight physical discrepancies resulting from manufacture. Stated differently, each component is manufactured to a particular tolerance, and is not perfectly shaped due to real world limitations. In addition, over time the components and seal will tend to change shape due to thermal distortion and physical wear. As a result, the amount of leakage of air around the burner tube cannot be effectively controlled and tends to be non-uniform, varying from one location to another.

In the past, a substantial number of seals have been employed in turbine systems. Labyrinth seals have been employed between rotating mating surfaces or vibrating mating surfaces. However, labyrinth seals do not easily conform to vibratory movement or rotating surfaces, particularly when the surfaces have imperfections. Consequently, labyrinth seals have not proven particularly effective.

Brush seals have been used in many environments including in gas and steam turbines. Brush seals generally conform better to rotating and/or vibrating mating surfaces than labyrinth seals including surfaces having imperfections. While brush seals have proven more effective than labyrinth seals, they are exceedingly expensive to manufacture and difficult to handle. For example, the very fine bristle wires of a brush seal are not bound together prior to assembly. As a result, it is an arduous process to lay out a predetermined layer of bristles to the required thickness to form a bristle pack suitable to form the resulting seal. Consequently, there is a need to provide a less expensive mechanism for providing a low leakage seal which is sufficiently resilient to accommodate the dimensional changes in the radial, axial, and circumferential directions resulting from wear and thermal growth. Also, there is a need for a seal that can regulate the amount of leakage there through.

BRIEF SUMMARY OF THE INVENTION

The present invention overcomes many of the shortcomings of prior art seals. According to an illustrative implementation of the present invention, a cloth seal interfaces two mating bodies, taking into account the pressure through the interface. In one aspect of the invention, a low leakage cloth seal is provided where, based on the pressures through the interface, the cloth seal may be designed to include an area where fluids including gas can flow through at least portion of the cloth assemblage of the cloth seal. In another aspect of the invention, gas flowing through the seal can be used to purge a cavity of unwanted gases and/or cool the cavity or surfaces of the mating bodies providing the cavity boundaries.

In yet another aspect of the invention, knowing the pressure differential through the interface, the density of the cloth seal including thickness and number of cloth layers may be designed to allow for a desired leakage amount or flow rate. In another aspect of the invention, an effective seal between mating surfaces can be realized by using a cloth seal, which is flexible and sufficiently resilient to accommodate the dimensional changes in the radial, axial, and circumferential directions resulting from wear, vibration, thermal distortion and other types of movement. In still another aspect of the invention, the density of the cloth seal can be selected based on the pressure drop across the seal in order to minimize the needed contact load to maintain sealing contact, thereby reducing wear of the mating body and the seal.

In another aspect of the invention, a high temperature, woven cloth seal can be provided in a tubular cavity between a burner tube of a fuel nozzle and a cap assembly to act as an interface. In another aspect of the invention, leakage through the woven cloth seal can be controlled to purge a tubular cavity separating the burner tube and cap assembly of unwanted hot gases.

According to another aspect of the invention, a cloth seal design can be implemented with a shim assemblage in contact with a high pressure region and a portion of the shim assemblage making seal contact with a mating member to effectively block leakage while improving wear resistance. In another aspect of the invention, a pressure activated high temperature woven cloth seal can be used as a dynamic seal around rotating components.

In yet another aspect of the invention, shim stiffness can be adjusted to reduce contact forces on a mating body due to pressure loading. Knowing the pressure differential across the cloth seal, the seal design may be tuned or calibrated to have a stiffness which assures seal contact up to a preset pressure level.

In still another aspect of the invention, a seal assembly can include a cloth seal having a cloth assemblage and a shim assemblage, the cloth seal adapted to seal a tubular cavity between a mating body and a tubular member. The cloth seal can be physically attached to the mating body and extend through the tubular cavity to make sealing contact with the tubular member. Also, the cloth seal can divide the tubular cavity into a high pressure region and a low pressure region. In an aspect of the invention, the cloth assemblage is wrapped around the shim assemblage.

One of the advantages of the cloth seals according to embodiments of the present invention is that their relative cost is significantly reduced from the cost of other seals used in circular sealing applications.

These and other novel advantages, details, embodiments, features and aspect of the present invention will be apparent to those skilled in the art from following the detailed description of the invention, the attached claims and accompanying drawings, listed herein, which are useful in explaining the invention.

DETAILED DESCRIPTION OF THE INVENTION

Figure 1:
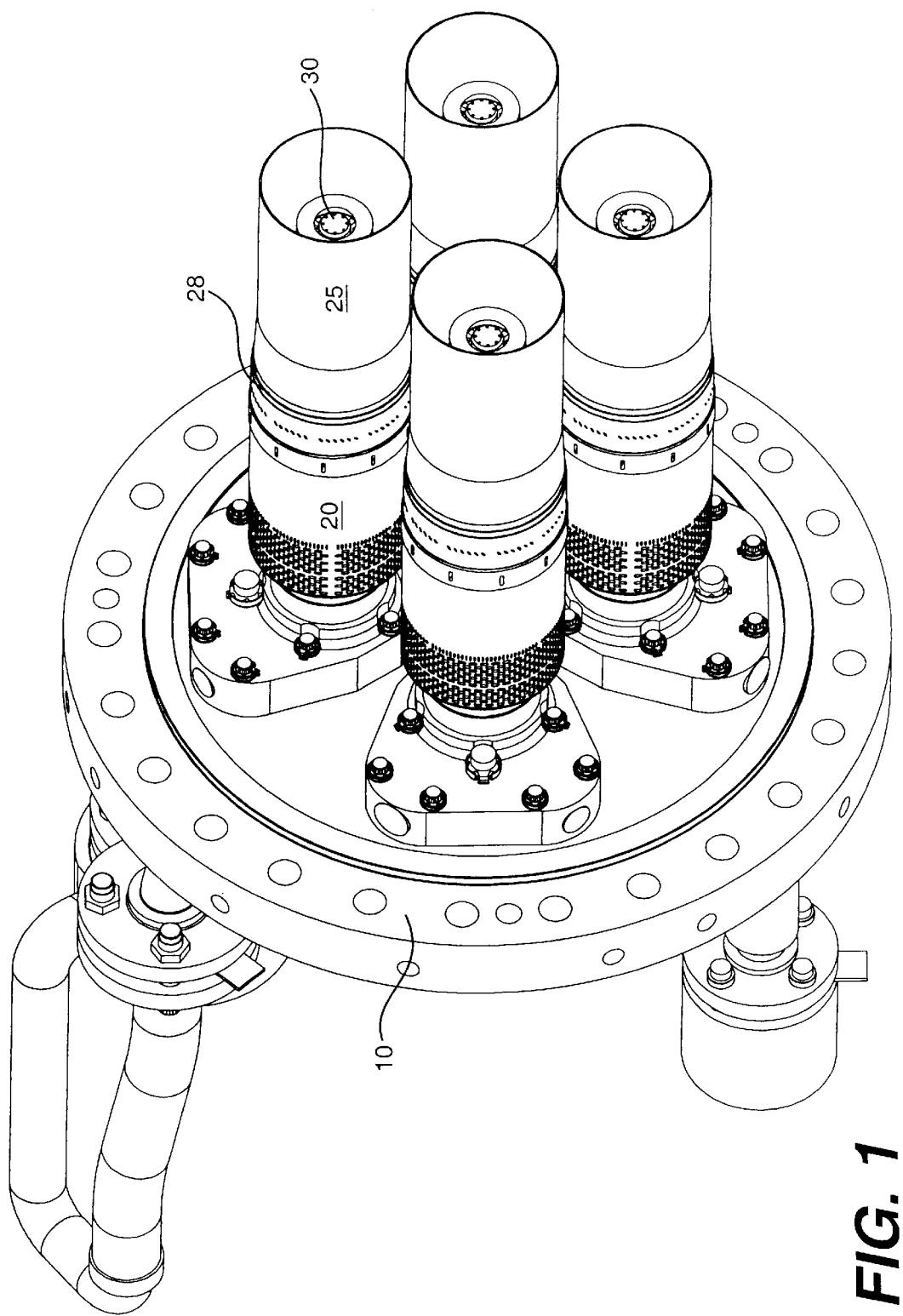
FIG. 1 shows a perspective view of an illustrative fuel nozzle and manifold assembly in a gas turbine.
Figure 2:
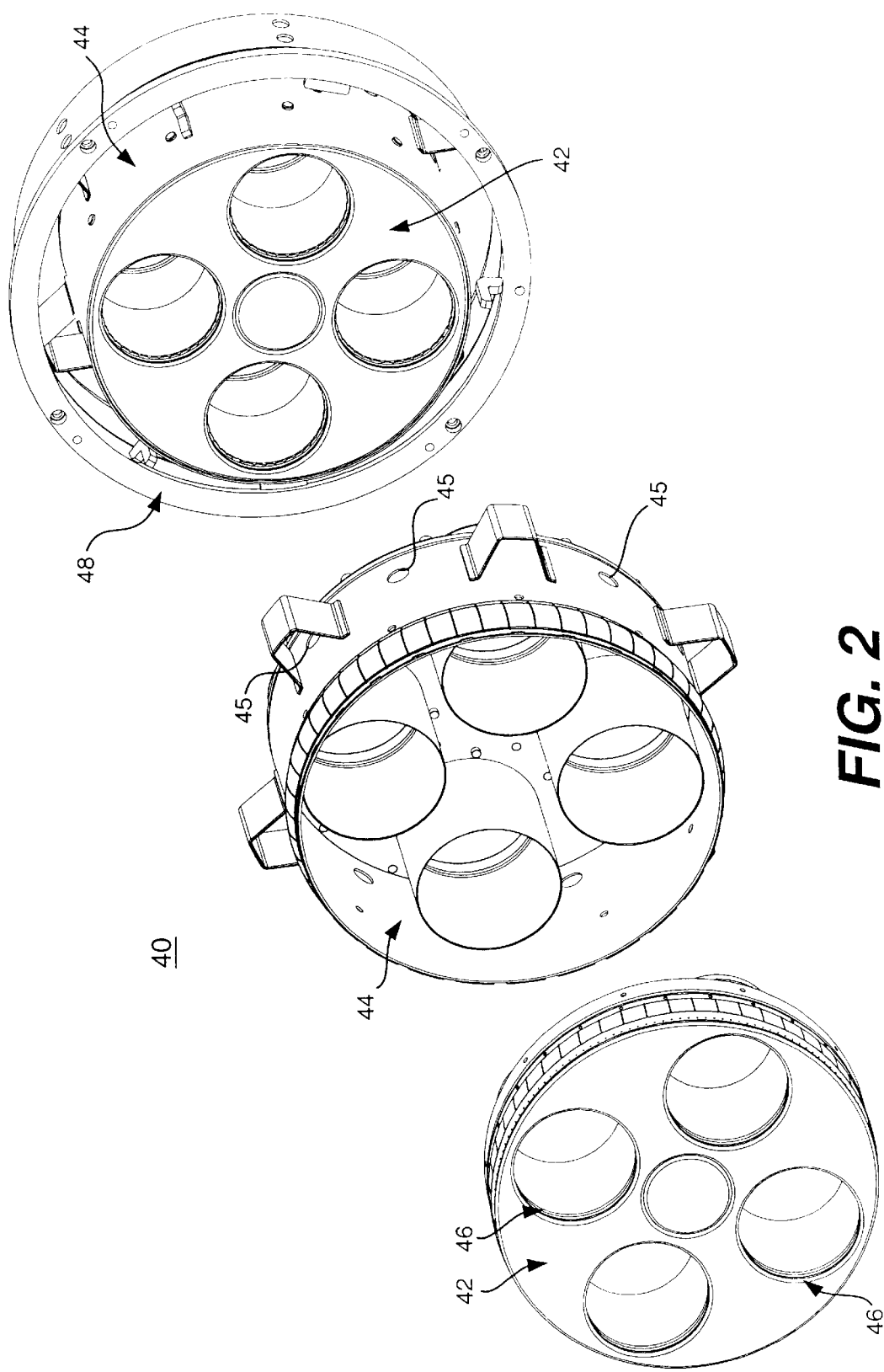
FIG. 2 shows an exploded view of an illustrative cap assembly to which plural fuel nozzles can be interfaced in a gas turbine.
Figure 3:
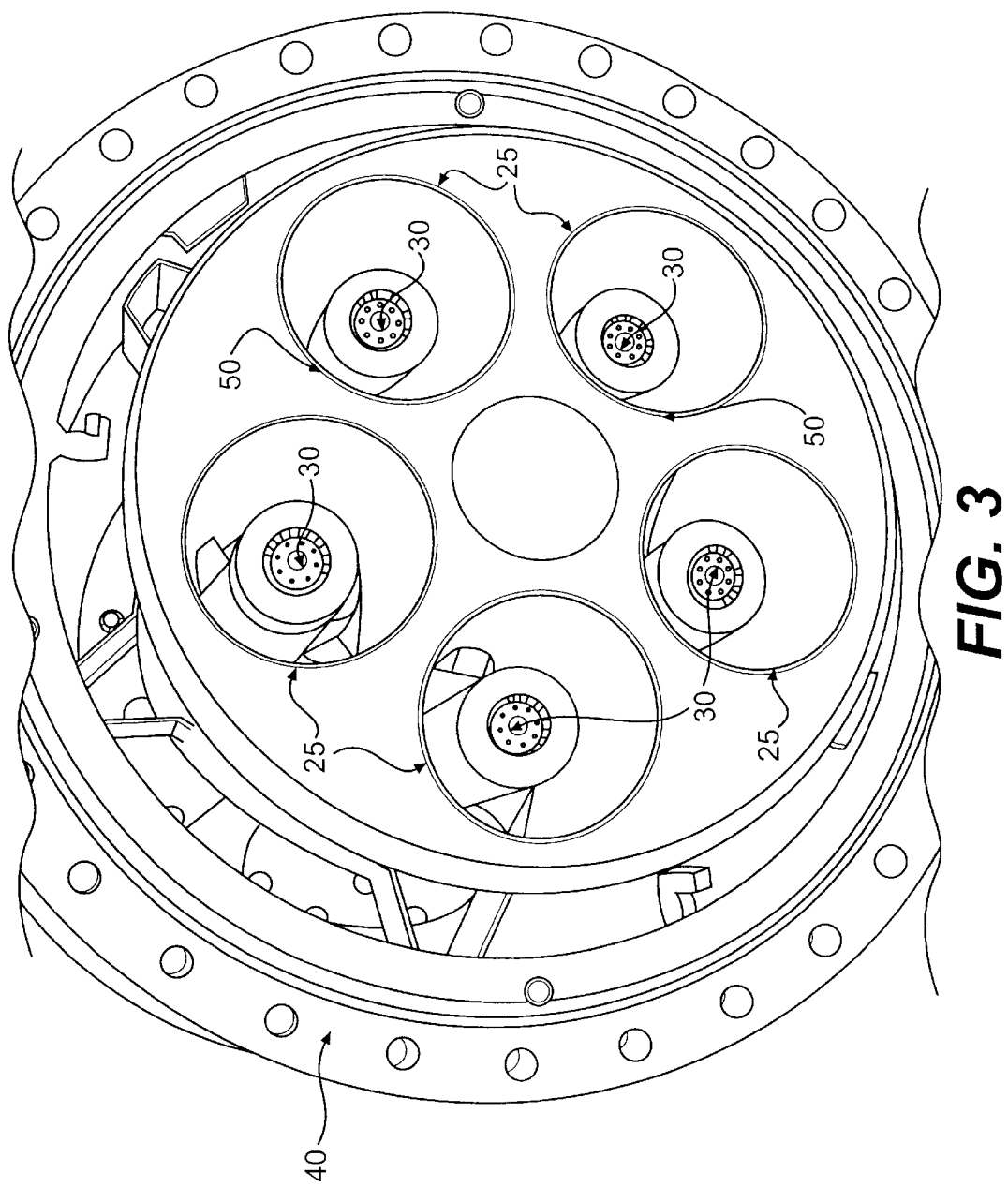
FIG. 3 shows a perspective view taken from a combustion zone of an illustrative cap assembly interfacing with a plurality of fuel nozzles in a gas turbine according to an exemplary embodiment of the present invention.

Referring to FIGS. 1–4, an exemplary gas turbine environment in which the present invention may be implemented is shown. In gas turbines, plural combustors are disposed in an annular array around the axis of the machine. As shown in FIG. 1, each combustor includes plural fuel nozzles 20, which are attached to a fuel manifold plate 10 called an endcover. The number of fuel nozzles 20 may vary depending on desired performance (e.g., FIG. 3 shows five fuel nozzles and FIG. 1 shows four fuel nozzles). Each fuel nozzle 20 has many components including the burner tube 25, which is to the remainder of the fuel nozzle 20 by, for example, a weld 28. Also, each fuel nozzle 20 has a diffusion gas tip 30. The fuel nozzles 20 penetrate through a structure called a cap assembly 40, which provides the boundary between compressor air used for the combustion process and a combustion burning zone. A burner tube 25 of each fuel nozzle 20 engages the cap assembly 40 through an interface (not shown in FIGS. 1–3). The interface is located in a tubular cavity 50 between the burner tube 25 and the cap assembly 40. The fuel nozzle 20 allows gas and air to premix in the premixer zone 52 of the burner tube 20 prior to the actual combustion in the combustion burning zone or "reaction zone". The combustion burning zone is directly downstream from the diffusion gas tip 30 of the burner tube 25. Premixing of gas and air prior to combustion allows a more uniform fuel/air mixture and is important in minimizing emissions in gas turbines.

Figure 4:
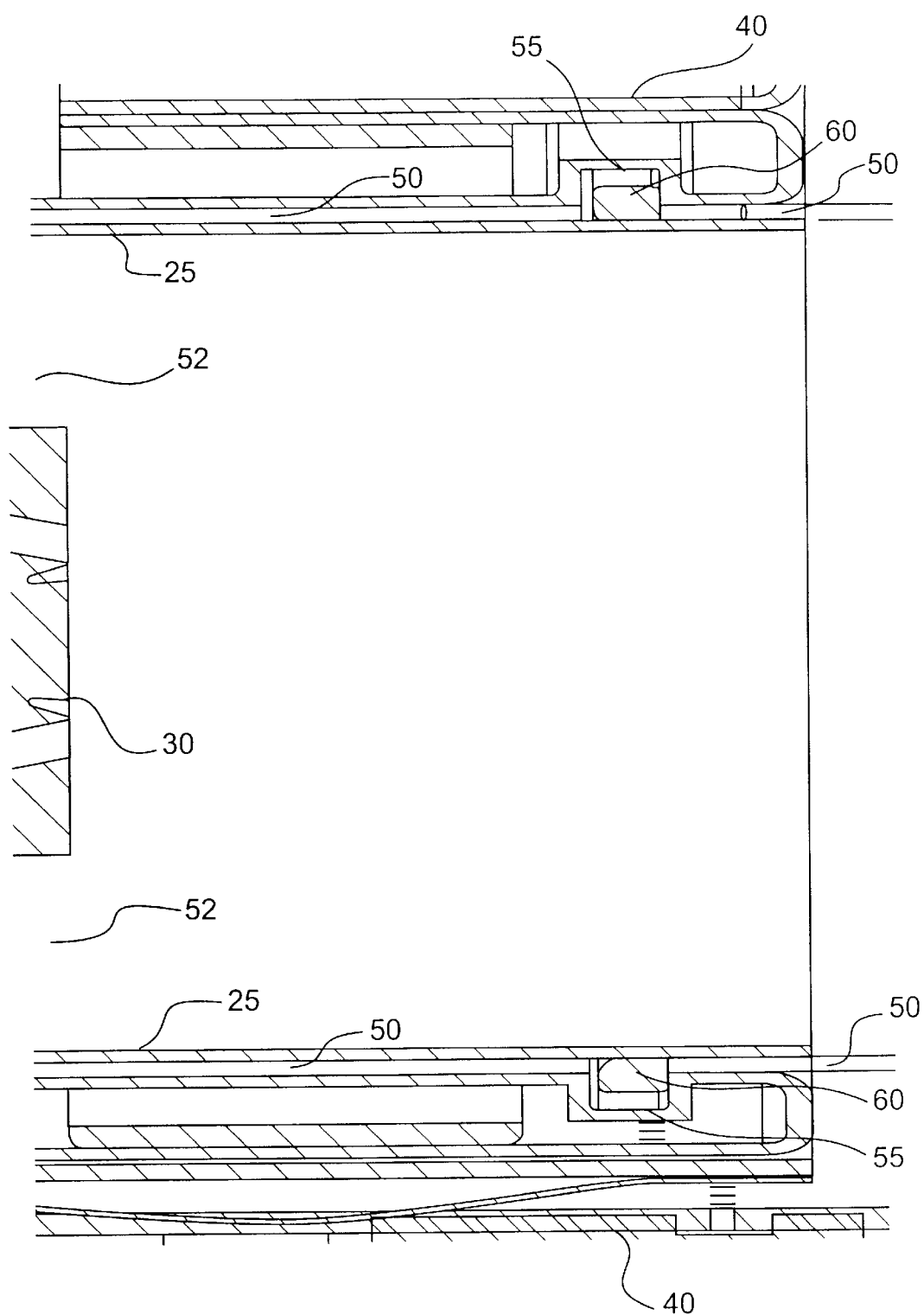
FIG. 4 shows a partial cross section of the interface region between the cap assembly and fuel nozzle according to an exemplary embodiment of the present invention.

Referring to the exploded view of the cap assembly 40 depicted in FIG. 2, the cap assembly 40 includes inner body assembly 42, outer body assembly 44 and outer barrel assembly 48. The outer barrel assembly 48 is shown with the outer body assembly 44 coupled thereto and the inner body assembly 42 coupled to the outer body assembly 44. Four fuel nozzles 20 engage with the cap assembly 40 in the four tubular holes in the outer body assembly 44. In an illustrative embodiment of the present invention, the locations 46 represent exemplary portions of the cap assembly 40 where a seal can interface with the burner tube of the fuel nozzle. Air can flow through holes 45 (in FIG. 2) and eventually into the tubular cavity 50 between the cap assembly 40 and the burner tube 25 as shown in FIG. 3. FIG. 4 depicts a partial cross section of the cap assembly 40 with the burner tube 25 engaged therein. As shown, a seal assembly 60 including the cloth seal is placed in the tubular cavity 50 between the burner tube 25 and the cap assembly 40. A seal retainer 55 couples the seal assembly 60 to the cap assembly 40. The seal retainer 55 may be permanently fixed to and part of the cap assembly 40.

Figure 5A:
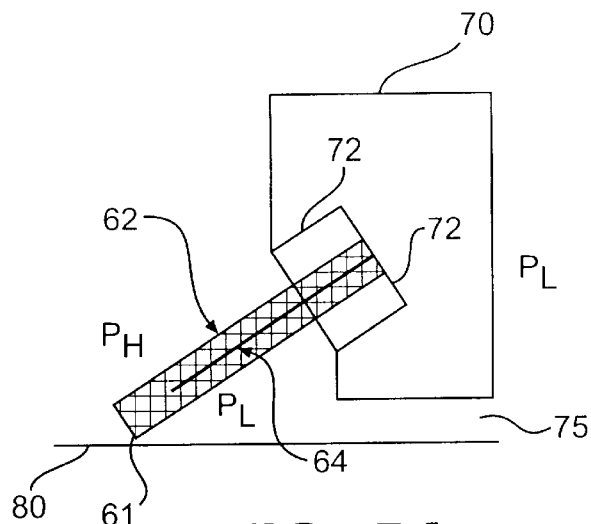
FIGS. 5A–5C show cross-sectional views of illustrative cloth seal configurations according to exemplary embodiments of the present invention.
Figure 5B:
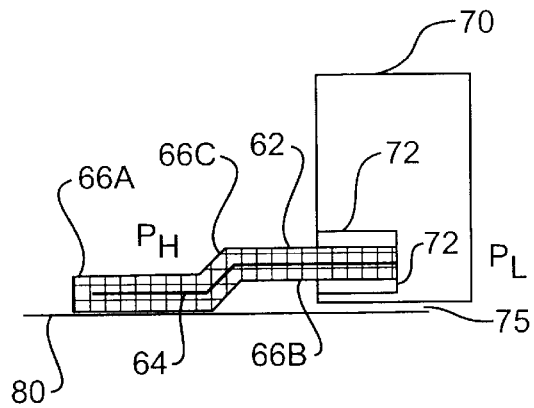
Figure 5C:
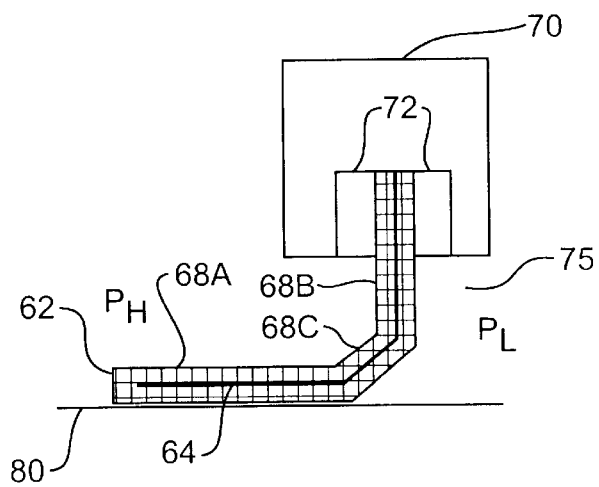

FIGS. 5A–5C illustrate exemplary wrapped cloth seal configurations that may be employed as the interface between burner tube 25 and cap assembly 40 shown in FIG. 4. It should be understood that the cloth seal configurations in FIGS. 5A–5C and 6A–6C may be used as low leakage static seals around nozzles, tubes and other circular sealing applications or as dynamic seals around rotating components in, but not restricted to, gas or steam turbine environments.

Figure 6A:
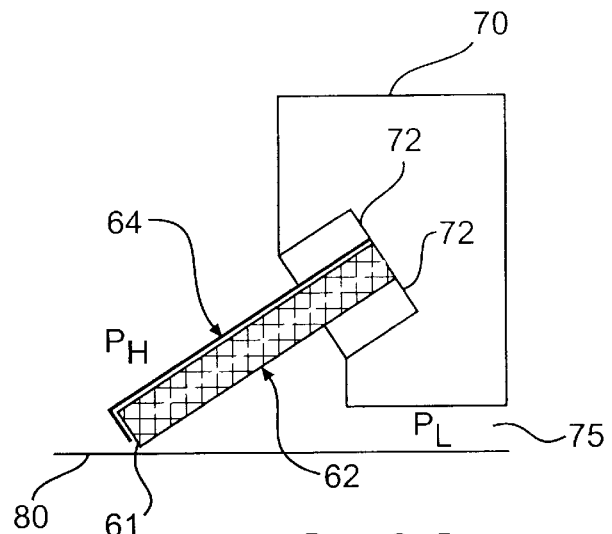
FIGS. 6A–6C show cross-sectional views of illustrative cloth seal configurations according to other exemplary embodiments of the present invention.
Figure 6B:
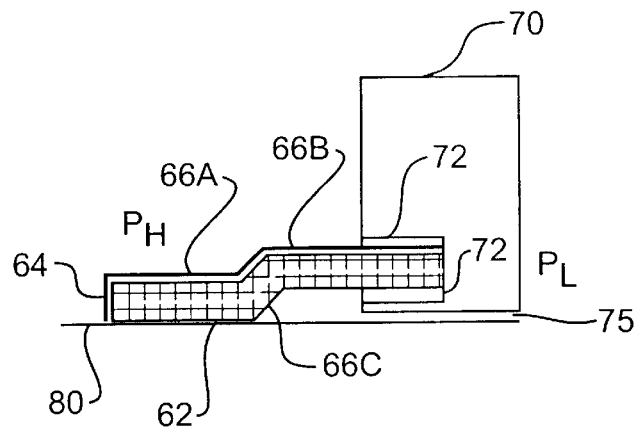
Figure 6C:
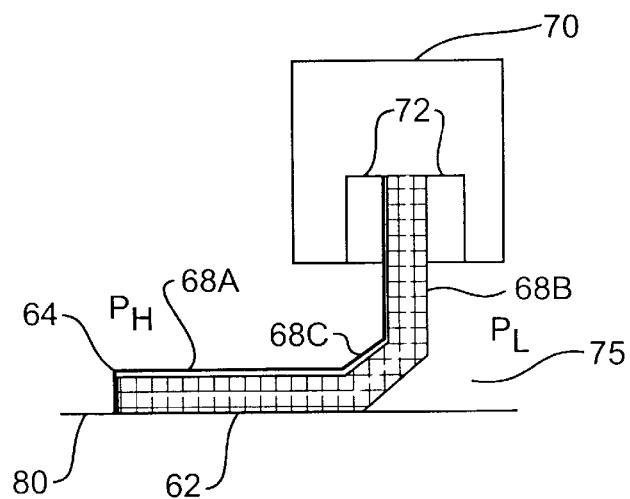

FIGS. 6A–6C illustrate exemplary crimped cloth seal configuration that may be employed as an interface in static application or dynamic applications, such as around rotating components, where no leakage is desired.

As shown in FIGS. 5A–5C, a long flexible cloth-shim assemblage (i.e., the cloth seal) includes a composite structure of a cloth assemblage 62 wrapped around a shim assemblage 64 extending from a first mating body 70. The cloth-shim assemblage extends into a cavity 75 and makes contact with and seals a second mating body 80. It should be understood that the second mating body 80 may either be a static or rotating component. The flexible cloth-shim assemblage can be sandwiched between metal plates 72 both forming part of an exemplary seal assembly. The metal plates 72 may be considered analogous to the seal retainer 55 in the exemplary gas turbine application depicted in FIG. 4.

In the illustrative embodiment of the invention shown in FIG. 5A, an edge 61 of the cloth seal, which is part of the cloth assemblage 62, makes sealing contact with the second mating body 80. In one embodiment of the invention where the mating body 80 is a tubular member, the cloth seal including the cloth-shim assemblage defines a substantially frusto-conical shaped section.

FIGS. 5B and 5C show other exemplary embodiments of the invention. In FIG. 5B (FIG. 5C), the cloth seal includes a first portion 66A (68A in FIG. 5C) making sealing contact with the mating body 80, a second portion 66B (68B in FIG. 5C) physically coupling the cloth seal to the mating body 70, and a joining portion 66C (68C in FIG. 5C) for connecting the first portion 66A (68A in FIG. 5C) and the second portion 66B (68B in FIG. 5C). In a preferred embodiment of FIG. 5B (FIG. 5C), first portion 66A (68A) is a cylindrical portion and the joining portion 66C (68C in FIG. 5C) defining a substantially frusto-conical shaped section. In a preferred embodiment of FIG. 5B, the second portion is also a cylindrical portion. In FIG. 5B (FIG. 5C), a portion of the cloth assemblage 62, which is part of the first portion 66A (68A in FIG. 5C), makes sealing contact with the mating body 80. The first portion 66A (68A) also includes another portion of the cloth assemblage 62 and a portion of the shim assemblage 64.

FIGS. 6A–6C also depict a long flexible cloth seal including a composite structure of a cloth assemblage 62 and a shim assemblage 64. Differently from the cloth-shim assemblage of FIGS. 5A–5C, the shim assemblage 64 has an outer periphery in contact with the high pressure region PH of the cavity 75 with a crimped edge in contact with the second mating body 80. An inner periphery of shim assemblage 64 is coupled to an outer periphery of the cloth assemblage 62, with the inner periphery of the cloth assemblage 62 being in contact with the low pressure region $P_L$ of the cavity 75.

The exemplary embodiment of the invention of FIG. 6A is similar in shape to the embodiment of FIG. 5A. Differently, in FIG. 6A, when the cloth seal including the cloth-shim assemblage defines a substantially frusto-conical shaped section, an outer boundary of the substantially frusto-conical shaped section is defined by the shim assemblage 64. Also, in FIG. 6A, an edge 61 of the cloth seal, which is part of the shim assemblage 64, makes sealing contact with the second mating body 80.

The exemplary embodiments of FIGS. 6B and 6C are similar in shape to the embodiments of FIGS. 5B and 5C, respectively. In FIG. 6B (FIG. 6C), the cloth seal includes a first portion 66A (68A in FIG. 6C) making sealing contact with the mating body 80, a second portion 66B (68B in FIG. 6C) physically coupling the cloth seal to the mating body 70, and a joining portion 66C (68C in FIG. 6C) for connecting the first portion 66A (68A in FIG. 6C) and the second portion 66B (68B in FIG. 6C). In a preferred embodiment of FIG. 5B (FIG. 6C), first portion 66A (68A) is a cylindrical portion and the joining portion 66C (68C in FIG. 6C) defining a substantially frusto-conical shaped section. In a preferred embodiment of FIG. 6B, the second portion is also a cylindrical portion. In FIG. 6B (FIG. 6C), a portion of the shim assemblage 64 and a portion of the cloth assemblage 62, which are parts of the first portion 66A (68A in FIG. 6C), make sealing contact with the mating body 80. The first portion 66A (68A) also includes another portion of the cloth assemblage 62.

In embodiments of the cloth seal of FIGS. 6A–6C, the shim assemblage 64 may be slotted to allow low leakage. Alternatively, in certain embodiments, the shim assemblage 64 may not be slotted and impervious to effectively choke the leakage flow. When the shim assemblage 64 is not slotted, the cloth seal may be applied to applications attempting to minimize or eliminate leakage such as between a transition piece and a first stage nozzle in a gas turbine. In this instance, the cloth seal is used between two flat surfaces rather than around a tubular member. Also, the configurations of the illustrative embodiments shown in FIGS. 6A–6C may be modified so that the shim assemblage 64 and a portion of the cloth assemblage 62 can be in contact with the high pressure region PH with only the cloth assemblage 62 making sealing contact with the mating body 80. These configurations may be used in low leakage applications such as between a fuel nozzle burner tube 25 and cap assembly 40 described with reference to FIGS. 1–4.

The cloth-shim assemblage in each of the embodiments of FIGS. 5A–5C is designed to permit leakage of fluids (e.g., gas such as air) through the seal. It should be understood that leakage according to embodiments of the invention will be described below in terms of gas leakage, and that such description is merely illustrative and that the present invention may be applied to leakage of fluids other than gas.

In illustrative embodiments of the present invention, leakage occurs at least through the cloth assemblage 62 portion of the cloth seal located between the tip or bottom portion of the shim assemblage 64 and the portion of the cloth seal contacting the second mating body 80. The cloth seal assemblage 62 is porous, thus permitting some gas flow. In alternative embodiments, the cloth seal may not include a shim assemblage in applications where high flow rates are desired, such as for cooling. As noted previously, leakage can occur through the shim assemblage 64, for example in slotted configurations of FIGS. 6A–6C.

Preferably, the thickness of the cloth-shim assemblage is generally constant over the entire structure. An area of high pressure can be found on a outer side of the cloth-shim assemblage as represented by $P_H$ and an area of low pressure $P_L$ can found on an inner side of the cloth-shim assemblage. Consequently, when the size of the cavity 75 changes due to, for example, relative vibration, relative rotation, and/or thermal differential expansion of the first mating body and the second mating body 80, the cloth seal can maintain sealing contact with the second mating body 80. In this regard, the cloth seal can be tuned to provide the necessary stiffness to maintain sealing contact based on the different pressure levels.

The cloth assemblage 62 of the cloth seal is flexible and includes at least one layer of cloth wrapped around the shim assemblage 64 in embodiments like those of FIGS. 5A–5C. Alternatively, the cloth layer may include two overlying layers of cloth. Each cloth layer may include metal, ceramic and/or polymer fibers that have been woven, knitted or pressed into a layer of fabric. Each cloth layer provides sacrificial wear volume and wear resistance without a significant increase in stiffness to the seal. Cloth layers, due to their porosity, are more resilient than metal layers. Thus, cloth seals can more readily adapt to the changing size and shape of mating bodies caused by thermal distortion, vibration and other relative movement, thereby providing an effective seal. In addition, the cloth assemblage can reduce heat conducted to the shim assemblage, thereby lessening structural degradation to mating members caused by friction when metal rubs against metal.

Choices as to the construction of the cloth layer (e.g., woven, knitted or pressed), the material(s) selected for the cloth layer, and the thickness of the cloth layer can be made by one skilled in the art when desiring to tune or calibrate the seal based on the wear resistance, flexibility and sealing requirements associated with the particular seal application. Multiple cloth layers can include different materials, different layer construction (e.g., woven, knitted or pressed), and/or have different thicknesses or densities depending on the seal application. In turbine applications, the cloth layer is preferably woven (e.g., using a Dutch Twill weave). An exemplary cloth assemblage used in turbine applications employs a Dutch Twill woven cloth layer, the cloth layer being made of a high-temperature Cobalt-based super-alloy such as L-605 or Haynes-25.

The shim assemblage 64 of the cloth seal can be flexible, resilient, generally imperforate, and generally impervious to gas. The resilient quality of the shim assemblage 64 maintains the sealing properties of the cloth seal while allowing for different surface shapes, assembly misalignment, vibration and/or thermally-induced relative movement between the first and second mating surfaces. Thus, the flexible shim assemblage 64 serves as a structural member carrying the pressure loads while providing some resiliency, which allows the cloth seal to recover after interference or excursion, i.e., displacement from a free state.

The shim assemblage 64 comprises at least one shim (thin metal layer) layer, but may comprise two or more superimposed and identical shim layers for increased strength. For turbine applications, the shim assemblage preferably contains four or fewer shim layers. The shim assemblage 64 may have sliced and/or staggered pieces of sheet metal spot-welded together to add flexibility, while maintaining strength, and/or to help the seal conform to the curvature of surfaces of the mating bodies. Also, the shim assemblage 64 may be slotted to allow a relatively small amount of fluid to flow through the cloth seal. The choices of materials for the shim assemblage and the thickness of each layer of shim can be made by one skilled in the art to tune or calibrate the seal in accordance with sealing, flexibility and resiliency needs of the particular seal application. Each shim layer includes a metal, ceramic and/or polymer sheet. For turbine applications, the shim assemblage generally has a thickness between 1/100 and 1/5 of an inch and each shim layer includes a high temperature, cobalt based super-alloy, such as Inco-750 or HS-188.

In applications where minimizing contact loads is necessary to maximize wear life (e.g., sealing around a rotating shaft), shim stiffness can be adjusted to reduce contact forces caused by pressure loading (i.e., the pressure differential across the seal). Further, the design of the cloth seal can be tuned to provide calibrated stiffness to assure seal contact only beyond predetermined differential pressure levels. Knowing the differential pressure levels, the shim assemblage can be designed to include the appropriate staggering and/or slicing of the shim layers and/or cloth layers to satisfy the maximum differential pressure levels, thereby controlling the contact load and minimizing wear. Further, the density of the cloth-shim assemblage can be selected based on the expected pressure drop across the seal to ensure that the cloth seal of the present invention makes sealing contact with a mating body. In this way, it is possible to select the density of the seal so that the contact force applied to the seal is slightly above the minimum contact force needed to maintain sealing contact for the particular temperature and pressure conditions.

Applying the cloth seal to the gas turbine application shown in FIGS. 1–4, the first mating body corresponds to the cap assembly 40 including the seal retainer 55 which is fixedly attached thereto, the second mating body corresponds to the burner tube 25, and the cavity 75 corresponds to the tubular cavity 50. In this application, the air flows from the high pressure side to the low pressure side.

Referring to FIGS. 3 and 4, a fuel/air premixture exits a premixer zone 52 between the burner tube 25 and diffusion gas tip 30 and enters the combustion burning zone in a swirling manner. Due to the pressure gradients caused by the swirling mixture, some of the hot gases tend to back flow into the tubular cavity 50. The backflow of hot gases into the tubular cavity 50 can damage the hardware including the burner tube 25 and cap assembly 40. To prevent this problem and to purge the tubular cavity of hot gases, a cloth seal according to exemplary embodiments of the present invention (e.g., wrapped seals in FIGS. 5A–5C) can be used as an interface between the burner tube 25 and cap assembly 40. The exemplary cloths seals according to the invention, allow air to flow through the tubular cavity 50 from the high pressure side and through the seal forcing the hot gas backflow out of the tubular cavity 50.

The resiliency of cloth seals allows for the accommodation of any non-uniformity in the seal interface (e.g., warping, thermal distortion) in the design of the cloth seal. Also, illustrative low leakage cloth seals according to the invention can be designed to control the leakage passing through the seal by selecting the cloth seal density (e.g., effective flow area through the cloth seal assemblage 62 in FIGS. 5A–5C when the shim assemblage 64 is impervious) taking into account the pressure drop through the seal interface. That is, knowing the flow conditions (i.e., pressure and temperature) and the pressure drop between the high pressure region and low pressure region, the seal density (effective flow rate through the seal) can be set to a desired leakage flow rate. In setting the desired leakage, the following relationship can be employed for incompressible flow:

$$W = A_{eff} \cdot \sqrt{(2g_c/RT_H) \cdot P_H \cdot (P_H - P_L)}$$

where $A_{eff}$=effective area of seal; $g_c$=gravitational constant; R=gas constant for air; $P_H$=upstream pressure–high pressure region pressure; $P_L$=downstream pressure–low pressure region pressure; $T_H$=high pressure region temperature and W=leakage.

While the above example of the present invention involves a sealing interface between a cap assembly and burner tube, it should be understood that the present invention can apply to many other gas and steam turbine applications as well as other sealing applications. For example, embodiments of the cloth seal of the present invention include any application, whether it be between flat surfaces around a static or rotating tubular member or otherwise, in which pressure differentials and/or flow rate control can be applied.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A seal assembly comprising a cloth seal including a shim assemblage and a cloth assemblage, said cloth seal defining a substantially frusto-conical shaped section, said cloth seal adapted to make sealing contact with a sealing member having a peripheral surface, said cloth seal adapted to seal a cavity between a mating body and the sealing member; wherein an outer boundary of the substantially frusto-conical shaped section is defined by said shim assemblage extending between said mating body and said sealing member, said shim assemblage having an edge adapted to make sealing contact with the sealing member on said peripheral surface, and a portion of the said cloth assemblage being adapted to make sealing contact with said peripheral surface of said sealing member.

2. The seal assembly according to claim 1, wherein the shim assemblage is adapted to permit a gas to flow through the outer boundary to the cloth assemblage.

3. The seal assembly according to claim 2, wherein said peripheral surface is substantially cylindrical.

4. The seal assembly according to claim 2, wherein said mating body is a cap assembly and said sealing member is a fuel nozzle for a turbine engine.

5. The seal assembly according to claim 1, wherein a density of said cloth seal is based on an expected pressure differential on opposing sides of said cloth seal when making sealing contact with the sealing member.

6. The seal assembly according to claim 1, wherein said sealing member is rotatable.

7. A seal assembly comprising a cloth seal including a shim assemblage and a cloth assemblage, said cloth seal adapted to seal a cavity between a mating body and a sealing body having a peripheral surface, said cloth seal having a first cylindrical portion including an inner peripheral portion of said cloth assemblage adapted to make sealing contact with the peripheral surface of the sealing body, a portion adapted to couple said cloth seal to the mating body, and a joining portion for connecting said first cylindrical portion and said portion adapted to couple said cloth seal to the mating body.

8. The seal assembly according to claim 7, wherein said portion adapted to couple said cloth seal to the mating body is a second cylindrical portion.

9. The seal assembly according to claim 7, wherein said shim assemblage is disposed on an outer circumference of said cloth assemblage, said shim assemblage extending from a sealing edge of said first cylindrical portion to a distal edge of said portion adapted to couple said cloth seal to the mating body.

10. The seal assembly according to claim 7, wherein a density of said cloth seal is based on an expected pressure differential on opposing sides of said cloth seal when making sealing contact with the sealing body.

11. The seal assembly according to claim 7, wherein said first cylindrical portion includes an edge portion of said shim assemblage adapted to making sealing contact with the sealing body.

12. The seal assembly according to claim 7, wherein said joining portion defines a substantially frusto-conical shaped section.

13. A seal assembly comprising a cloth seal adapted to seal a cavity between a first mating body and the second mating body, and create a high pressure region and a low pressure region in said cavity, said cloth seal having a shim assemblage and a cloth assemblage physically attached to said shim assemblage wherein said shim assemblage defines an outer periphery for contacting the high pressure region of the cavity extending from the first mating body to the second mating body, a first peripheral portion of said cloth seal including said shim assemblage adapted to contact the high pressure region and a second peripheral portion of said cloth seal including a first portion of said cloth assemblage adapted to contact the low pressure region, wherein said first peripheral portion further includes a second portion of said cloth assemblage adapted for sealing engagement with said second mating body.

14. The seal assembly according to claim 13, wherein said second mating body is rotatable.

15. The seal assembly according to claim 13, wherein an edge of said shim assemblage in said first peripheral portion is adapted to make sealing contact with the second mating body.

16. An apparatus comprising:
a first mating body;
a second mating body disposed relative to said first mating body so as to form a cavity between said first mating body and second mating body, said cavity adapted for a high pressure region and a low pressure region; and
a cloth seal attached to said first mating body and extending through said cavity to make sealing contact with said second mating body, said cloth seal dividing said cavity into the high pressure region and the low pressure region; wherein said cloth seal includes a cloth assemblage wrapped around a shim assemblage, a portion of said cloth seal making sealing contact with said second mating body excluding said shim assemblage; wherein said cloth seal includes a first cylindrical portion making sealing contact with said second mating body, a portion attached to said first mating body, and a joining portion for connecting said first cylindrical portion and said portion attached to said first mating body.

17. The apparatus according to claim 16, wherein said portion physically attached to said first mating body is a second cylindrical portion.

18. The apparatus according to claim 16, wherein said first mating body is a cap assembly and said second mating body is a fuel nozzle.

19. The apparatus according to claim 16, where said second mating body is rotatable.

20. An apparatus comprising:
a first mating body;
a second mating body disposed relative to said first mating body so as to form a cavity between said first mating body and second mating body, said cavity adapted for a high pressure region and a low pressure region; and
a cloth seal attached to said first mating body and extending through said cavity to make sealing contact with said second mating body, said cloth seal dividing said cavity into the high pressure region and the low pressure region;
wherein said cloth seal includes a shim assemblage and a cloth assemblage, wherein said shim assemblage defines an outer periphery for contacting the high pressure region of the cavity from the first mating body to the second mating body, and defines an inner periphery coupled to an outer periphery of said cloth assemblage, said cloth seal including an inner periphery of said cloth assemblage for contacting the low pressure region of said cavity, and said inner periphery of said cloth assemblage including a portion for making sealing contact with said second mating body;
wherein an end portion of the outer periphery of said shim assemblage extends over a distal end of said cloth assemblage defining an edge adapted to make sealing contact with said second mating body.

21. The apparatus to claim 20, wherein said cloth seal includes a first cylindrical portion including said end portion making sealing contact with said second mating body, a portion attached to said first mating body, and a non-cylindrical joining portion for connecting said first cylindrical portion and said portion physically attached to said first mating body.

22. The apparatus according to claim 21, wherein said first cylindrical portion includes an inner periphery of a portion of said cloth assemblage, which makes sealing contact with said second mating body.

* * * * *